June 17, 1924.

M. W. LONGFELLOW

GAS RANGE

Filed July 26, 1921

1,498,049

2 Sheets-Sheet 2

Inventor
Martin W. Longfellow

By Wm. F. Hodges
Attorney

Patented June 17, 1924.

1,498,049

UNITED STATES PATENT OFFICE.

MARTIN W. LONGFELLOW, OF BALTIMORE, MARYLAND, ASSIGNOR TO THE BALTIMORE GAS APPLIANCE & MANUFACTURING COMPANY, A CORPORATION OF MARYLAND.

GAS RANGE.

Application filed July 26, 1921. Serial No. 487,694.

*To all whom it may concern:*

Be it known that I, MARTIN W. LONGFELLOW, a citizen of the United States, residing at Baltimore, State of Maryland, have invented a new and useful Gas Range, of which the following is a specification.

This invention is a gas range of the so-called "cabinet" type.

One of the objects of the invention, is to provide a cabinet range particularly adapted for installation where space is limited, such as in small kitchens or kitchenettes, but which will have the capacity of many types of larger or more bulky ranges. A further object is to provide a compact cabinet range of maximum capacity, having burners located above the ovens, the latter being elevated to a sufficient height to avoid necessity of stooping on the part of the cook. A further object is to provide a cooking top placed above the oven, and provided with a warming area, so shaped that waste heat from the burners must pass thereunder, whereby the said area is maintained at a sufficiently high temperature to be used for warming purposes. A further object is to provide a cooking space located to one side of the oven, and on a lower plane than the cooking top, the warming area of the latter having an extension overhanging the said cooking space, and so positioned that waste heat from the burners must pass under said extension. A further object is to provide an advantageous positioning of the burners, conforming to the arrangement of ovens, cooking space and cooking top.

The invention will be hereinafter fully set forth and particularly pointed out in the claims.

In the accompanying drawings:—

Figure 1:
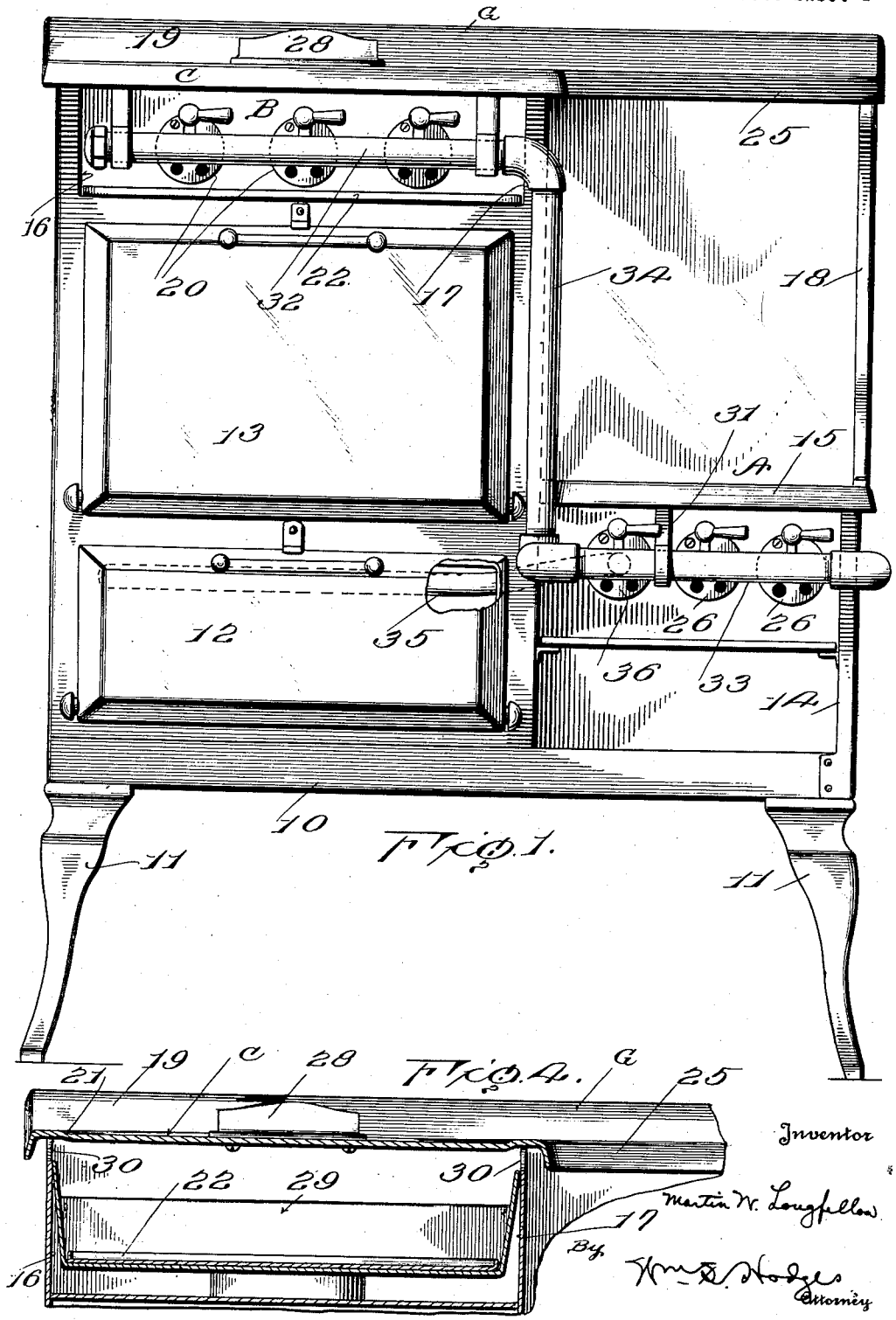
Figure 2:
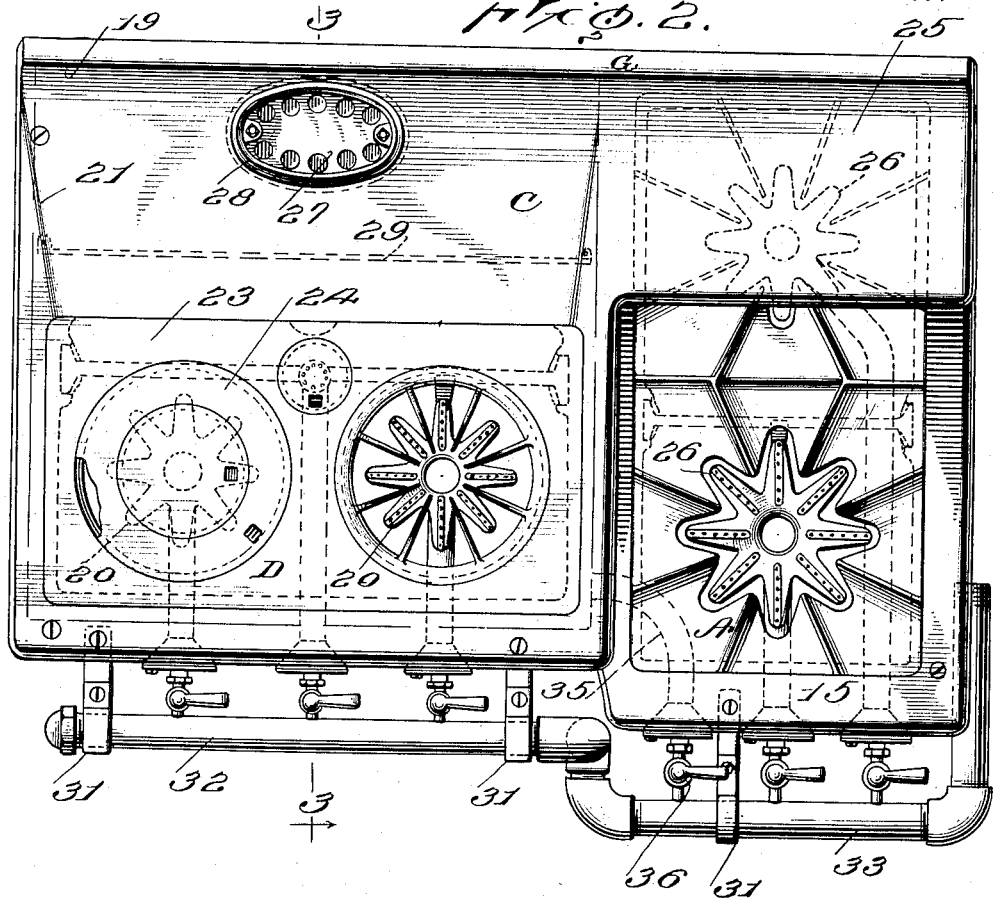
Figure 3:
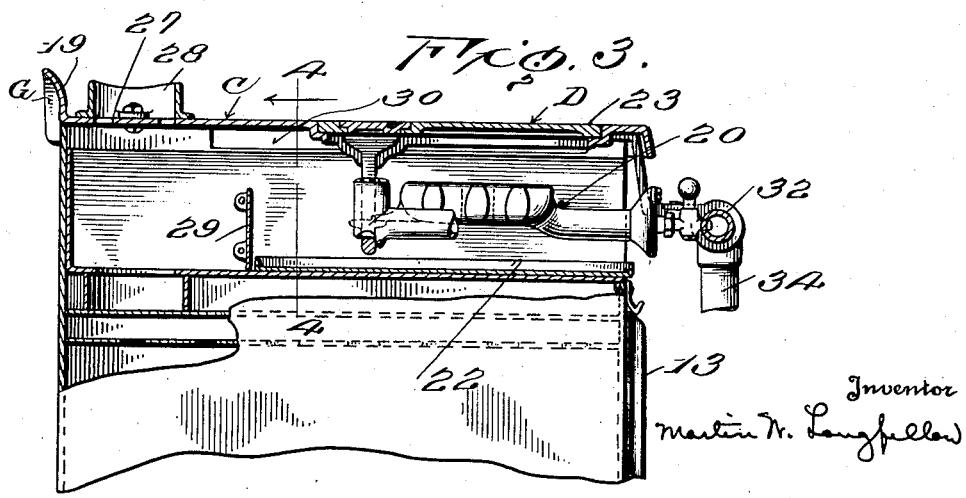

Figure 1 is a front elevation illustrating a gas range constructed in accordance with the invention. Figure 2 is a top plan view. Figure 3 is a transverse sectional view on the line 3—3, Figure 2. Figure 4 is a sectional view on the line 4—4, Figure 3.

Referring to the drawings, 10 designates a base of standard construction, supported by the usual legs 11. Supported by said base is the oven casing, which, in the form illustrated, is divided to provide a broiling oven 12, and a superposed baking oven 13. Supported by one end wall of the oven structure, and by an upright wall 14 carried by the base, is a side extension 15, which is provided with suitable burner openings, providing an open cooking space A, such as is common with gas ranges. Mounted upon extensions 16 and 17, of the oven walls, and upon a bracket 18, is a cooking top 19, the same being separated from the top wall of the oven 13, by a substantial space B. This space B is provided to accommodate burners 20, between the cooking top and the top wall of the oven 13.

The rear portion C of the cooking top 19, serves as a warming area, and is provided with an inclined surface 21, the inclination being such as to cause any or all overflow from the pots or kettles, resting on said area, to flow downwardly from the sides and back of the top, towards the front and through the openings for the burners 20. A pan 22 is provided to catch any such overflow. The cooking space D of the cooking top is provided with a removable plate 23, located immediately above the burners, and if desired the burner openings of said space D, may also be covered by suitable lids 24. The warming area C is provided with a reduced lateral extension 25, which projects over the cooking space A, and is located directly over one of the burners 26, in said cooking space. The free end of said extension is supported by the bracket 18. It will be noted that the cooking top 19, and the extension 25, are all shown as made of one integral piece of metal. The back edge of the cooking top is provided with an integral upstanding guard G, extending the full width of the range, so shaped that it will prevent cooking vessels from being pushed back too far. Because of its being an integral part of the cooking top, free from open joints, it may be easily kept clean.

In the rear portion of the warming area C is formed an opening 27, surrounded by a collar 28, shaped to engage a standard stove pipe, which may be connected with a chimney. In the space B, and back of the burners 20, is located a baffle plate 29 positioned to cause the waste heat from the burners to move upwardly, against the solid warming area C, of the cooking top 19, before passing out through the flue. The end wall 17 is also provided with an opening 30 so that the waste heat from the rearmost burner 26, will circulate beneath the extension 25, and pass to the opening 27.

The burners are all connected with a manifold rigidly secured to the range structure by suitable brackets 31, and provided with a horizontal branch 32 disposed opposite the space B, and a horizontal branch 33 disposed opposite to the cooking space 15, the two branches being connected by a vertical branch 34. The burner 35 for the ovens is connected to the branch 33, as indicated at 36, Figures 1 and 2.

The advantages of a gas range constructed as above described will be readily recognized. By employing the cooking top with a cooking space directly over the ovens, in addition to the cooking space A, it is possible to provide a very narrow range construction, which will at the same time have the oven and cooking capacities of larger or more bulky ranges. It will also be observed that ovens and the burners for the cooking top are elevated to a sufficient height, to make it unnecessary for the cook to stoop, and the cooking top is readily and conveniently accessible for all purposes. By shaping the cooking top as described, with the rear portion made solid, to serve as a warming area, and extending the warming area so as to project over the cooking space A, a maximum warming surface is provided, and it is possible to utilize the heat from both sets of burners, for this purpose. It will also be noted that the manifold which supplies the burners, extends across the front of the range, where it is readily accessible for the purpose of making connections or repairs.

Having thus explained the nature of the invention and described an operative manner of constructing and using the same, although without attempting to set forth all of the forms in which it may be made, or all of the forms of its use, what is claimed is:—

1. A gas range of the character described comprising an oven, means providing a cooking space at one side of the oven, a cooking top supported above the oven and in spaced relation thereto, said top having a warming area provided with an extension overhanging said cooking space, burners located in the space between the cooking top and the oven, and burners in said cooking space.

2. A gas range of the character described comprising an oven, means providing a cooking space at one side thereof, a cooking top supported above the oven and in spaced relation thereto, said cooking top having a forwardly located cooking space, and a rearwardly located warming area, said warming area having an extension overhanging the first mentioned cooking space.

3. A gas range of the character described comprising an oven, means providing a cooking space at one side of the oven, a cooking top supported above the oven and in spaced relation thereto, said top having a warming area provided with an extension overhanging said cooking space, burners located in the space between the cooking top and the oven, and burners in said cooking space, and means for causing waste heat from all of said burners to circulate beneath the warming area of said cooking top.

4. A gas range of the character described comprising an oven, means providing a cooking space at one side of the oven, a cooking top supported above the oven and in spaced relation thereto, said top being formed of one piece and having a cooking space and a warming area provided with an integral extension overhanging said cooking space, and burners located beneath the respective cooking spaces.

5. In a gas range, a cooking top formed of a single plate provided with a cooking space and a warming area, said warming area having a reduced lateral extension.

6. In a gas range, a cooking top formed of a single integral metal plate having a forwardly located cooking space and a rearwardly located warming area having a reduced lateral extension.

7. A gas range of the character described comprising an oven, means providing a cooking space at one side of the oven, a cooking top supported above the oven and in spaced relation thereto, said top having a warming area provided with an extension overhanging said cooking space, burners located in the space between the cooking top and the oven, and burners for the said cooking space, the space between the oven and the cooking top having end walls, the end wall adjacent the cooking space having an opening to permit circulation of heat under said extension.

8. A gas range of the character described comprising an oven, means providing a cooking space at one side of the oven, a cooking top supported above the oven and in spaced relation thereto, said cooking top having a warming area provided with an extension overhanging said cooking space and also having an opening, burners located between the space between the cooking top and the oven, burners for said cooking space, and means for causing heat to circulate beneath the warming area and its extension.

9. A gas range of the character described comprising an oven, means providing a cooking space at one side of the oven, a cooking top supported above the oven and in spaced relation thereto, said cooking top having a cooking space and a warming area to the rear of the cooking space, said warming area having an opening therein, burners beneath said cooking space, and a baffle plate located between said burners and said opening.

10. A gas range of the character described comprising an oven, a cooking top supported above the oven and in spaced relation thereto, said top having a cooking space, and also having a warming area provided with a lateral extension, means providing a second cooking space beneath said extension and in a lower plane than the first mentioned cooking space, burners located beneath the respective cooking spaces, a baffle plate located to the rear of the burners beneath the cooking space of the cooking top, and means co-operating with said baffle plate for causing heat to circulate beneath the said warming area and its extension.

11. A gas range of the character described comprising an oven, means providing a cooking space at one side of the oven, a cooking top supported above the oven and in spaced relation thereto, said top having a warming area provided with an extension overhanging said cooking space, a gas manifold having an upper branch in front of the space between the oven and the cooking top and a lower branch in front of the cooking space, an intermediate vertical branch connecting said horizontal branches, and burners connected to said horizontal branches.

12. A gas range of the character described comprising an oven, means providing a cooking space at one side of the oven, a cooking top supported above the oven and in spaced relation thereto, said top having a warming area provided with an extension overhanging said cooking space, a gas manifold having an upper branch in front of the space between the oven and the cooking top and a lower branch in front of the cooking space, an intermediate vertical branch connecting said horizontal branches, burners connected to said horizontal branches and an oven burner connected with the lowermost branch of said manifold at a point in front of said cooking space.

In testimony whereof I have hereunto set my hand.

MARTIN W. LONGFELLOW.